United States Patent
Lillibridge et al.

(10) Patent No.: US 8,117,343 B2
(45) Date of Patent: Feb. 14, 2012

(54) LANDMARK CHUNKING OF LANDMARKLESS REGIONS

(75) Inventors: Mark David Lillibridge, Mountain View, CA (US); John M. Czerkowicz, Northborough, MA (US); David Malcolm Falkinder, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 12/260,024

(22) Filed: Oct. 28, 2008

(65) Prior Publication Data

US 2010/0114980 A1 May 6, 2010

(51) Int. Cl.
*G06F 15/16* (2006.01)
(52) U.S. Cl. .................................................. 709/246
(58) Field of Classification Search .................. 709/230, 709/246
See application file for complete search history.

(56) References Cited

U.S. PATENT DOCUMENTS

| | | | |
|---|---|---|---|
| 5,638,509 A | 6/1997 | Dunphy | |
| 5,990,810 A | 11/1999 | Williams | |
| 6,513,050 B1 | 1/2003 | Williams | |
| 6,727,662 B2 | 4/2004 | Konopka | |
| 6,828,925 B2 | 12/2004 | McCanne et al. | |
| 6,839,680 B1 | 1/2005 | Liu | |
| 6,920,507 B1 | 7/2005 | Kley | |
| 6,938,005 B2 | 8/2005 | Iverson | |
| 6,961,009 B2 | 11/2005 | McCanne | |
| 7,047,240 B2 | 5/2006 | Sato | |
| 7,082,548 B2 | 7/2006 | Nakano | |
| 7,177,995 B2 * | 2/2007 | Yagawa | 711/162 |
| 7,185,066 B2 | 2/2007 | Noble | |
| 7,233,938 B2 * | 6/2007 | Carus et al. | 705/2 |
| 7,269,689 B2 | 9/2007 | Eshghi et al. | |
| 7,277,958 B2 * | 10/2007 | Chung et al. | 709/231 |
| 7,444,337 B2 | 10/2008 | Zhou | |
| 7,444,349 B1 | 10/2008 | Ochotta | |
| 7,487,228 B1 | 2/2009 | Preslan | |
| 7,562,110 B2 | 7/2009 | Miloushev | |
| 7,581,170 B2 * | 8/2009 | Baumgartner et al. | 715/234 |
| 7,647,358 B2 * | 1/2010 | Rogers et al. | 707/999.2 |
| 7,660,853 B2 * | 2/2010 | Scott et al. | 709/205 |
| 7,669,101 B2 * | 2/2010 | Udell et al. | 714/738 |
| 7,698,520 B2 * | 4/2010 | Minami et al. | 711/162 |
| 7,738,380 B1 * | 6/2010 | Dubrovsky et al. | 370/235 |
| 7,761,788 B1 * | 7/2010 | McKnight et al. | 715/248 |

(Continued)

FOREIGN PATENT DOCUMENTS

WO 2009030326 A1 3/2006

(Continued)

OTHER PUBLICATIONS

Fenstermacher et al.; "Mining Client-Side Activity for Personalization" Department of Management Information Systems, Eller College of Business and Public Administration, University of Arizona, Jun. 2002 (8 pages).

(Continued)

*Primary Examiner* — Hussein A Elchanti

(57) ABSTRACT

A computer-executed method for forming data chunks from a sequence of data values comprises determining whether processing of the sequence of data values has entered a landmark-free region. If processing has entered a landmark-free region, a data chunk is produced using a specialized landmark chunking technique that is specialized for landmark-free regions. Otherwise, the method comprises producing a data chunk using a standard-data landmark chunking technique.

19 Claims, 11 Drawing Sheets

U.S. PATENT DOCUMENTS

| | | | |
|---|---|---|---|
| 7,814,043 B2* | 10/2010 | Uchino | 1/1 |
| 7,930,749 B2* | 4/2011 | Ballard et al. | 726/24 |
| 7,945,539 B2* | 5/2011 | Farber et al. | 707/689 |
| 7,949,662 B2* | 5/2011 | Farber et al. | 707/747 |
| 7,979,491 B2 | 7/2011 | Lillibridge | |
| 2001/0010070 A1 | 7/2001 | Crockett | |
| 2002/0052769 A1 | 5/2002 | Navani | |
| 2002/0156912 A1 | 10/2002 | Hurst | |
| 2002/0169934 A1 | 11/2002 | Krapp et al. | |
| 2003/0065722 A1 | 4/2003 | Leperen | |
| 2003/0101449 A1 | 5/2003 | Bentolila | |
| 2003/0140051 A1 | 7/2003 | Fujiwara | |
| 2004/0103147 A1 | 5/2004 | Flesher | |
| 2004/0103413 A1 | 5/2004 | Mandava | |
| 2004/0162953 A1 | 8/2004 | Yoshida | |
| 2004/0225655 A1 | 11/2004 | Moulton | |
| 2005/0091234 A1 | 4/2005 | Hsu | |
| 2006/0059173 A1 | 3/2006 | Hirsch | |
| 2006/0059207 A1 | 3/2006 | Hirsch | |
| 2006/0293859 A1 | 12/2006 | Pipke | |
| 2007/0220197 A1 | 9/2007 | Lasser | |
| 2007/0250519 A1 | 10/2007 | Fineberg | |
| 2007/0250670 A1 | 10/2007 | Fineberg | |
| 2008/0126176 A1 | 5/2008 | Iguchi | |
| 2008/0133446 A1 | 6/2008 | Dubnicki et al. | |
| 2009/0112945 A1 | 4/2009 | Camble | |
| 2009/0112946 A1 | 4/2009 | Jones | |
| 2009/0113167 A1 | 4/2009 | Camble | |
| 2010/0198792 A1 | 8/2010 | Camble | |
| 2010/0198832 A1 | 8/2010 | Jones | |
| 2010/0205163 A1 | 8/2010 | Eshghi | |
| 2010/0235485 A1 | 9/2010 | Lillibridge | |
| 2010/0280997 A1 | 11/2010 | Lillibridge | |
| 2010/0281077 A1 | 11/2010 | Lillibridge | |

FOREIGN PATENT DOCUMENTS

| | | | |
|---|---|---|---|
| WO | 2006094365 A1 | 9/2006 | |
| WO | 2006094366 A1 | 9/2006 | |
| WO | 2006094367 A1 | 9/2006 | |
| WO | 2007127248 A2 | 11/2007 | |
| WO | 2009054827 A1 | 4/2009 | |
| WO | 2009054828 A1 | 4/2009 | |
| WO | 2009131585 | 10/2009 | |

OTHER PUBLICATIONS

Baoyao, Zhou; ""Intelligent Web Usage Mining"" Nanyang Technological University, Division of Information Systems, School of Computer Engineering, 2004 (94 pages).

Baynote Inc.: The Collective Intelligence Platform, Online, http://www.baynote.com/technology/platform/ 2010 (1 page).

Hottolink Inc.; "Recognize" Online, http://www.hottolink.co.jp/english/reconize.html, 2009 (2 pages).

Andrejko et al.: User Characteristics Acquisition from Logs with Semantics, Slovak University of Technology in Bratislava, 2007 (8 pages).

Hongjun Lu et al: Extending a Web Browser with Client-Side Mining, Hong Kong University of Science and Technology Department of Computer Science, Clear Water Bay, Kowloon, Hong Kong, China, 2003 (12 pages).

Shankar et al.; ""Personalized Web Search Based on Client Side Ontology"", CS 498: B.Tech Project,10. IIT Kanpur, India 2010 (9 pages).

Sendhikumar et al.; "Personalized ontology for web search personalization" Anna University, Chennai, India , 2008 (7 pages).

Shahabi et al.; "Yoda an Accurate and Scalable Web based Recommendation System?" University of SouthernCalifornia, Los Angeles, Sep. 2001 (14 pages).

Why WUBAT? Website User Behavior &Analysis Tool, WUBAT, Online, http://www.wubat.com/ dated on or before Oct. 12, 2010 (3 pages).

Claypool et al.; "Implicit Interest Indicators", Worcester Polytechnic Institute, Worcester, Computer Science Department Worcester Polytechnic Institute Worcester, MA 01609, USA., 2001 (8 pages).

Shahabi et al.; A Framework for Efficient and Anonymous Web Usage Mining Based on Client-Side Tracking, University of Southern California, Los Angeles, 2002 (48 pages).

Clattertrap; Online http://www.clattertrap.com; Jul. 20, 2010 (1 page).

HSNW: SRI defense technology spawns civilian application: published Jun. 29, 2010 (2 pages).

Anthony Ha: Facebook investor backs Chattertrap, a personal assistant for content, Jun. 28, 2010 (6 pages).

European Patent Office, International Appl. No. PCT/US2007/010015, Search Report and Written Opinion dated Jan. 2, 2008 (12 pages).

European Patent Office, EP 07756010.0, Examination Report dated Feb. 20, 2009 (4 pages).

Muthitacharoen Athicha, et al., "A Low-Bandwidth Network File System," Proceedings of the 18th ACM Symposium on Operating Systems Principles (SOSP '01), Oct. 2001.

L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.

You L. L. et al., "Deep Store an Archival Storage System Architecture" Data Engineering, 2005. ICDE 2005. Proceedings. 21st. intl Conf on Tokyo, Japan, Apr. 5-8, 2005, pp. 12.

Korean Intellectual Property Office, International Appl. No. PCT/US2007/0022586, Search Report and Written Opinion dated Jul. 23, 2008 (pp. 1-12).

Korean International Property Office, PCT/US2008/061576 Search Report dated Jan. 23, 2009 (2 pages).

Eshghi et al., "Jumbo Store: Providing Efficient Incremental Upload and Versioning for a Utility Rendering Service," 2007 (16 pages).

U.S. Appl. No. 10/870,783, Non-Final Rejection dated Dec. 15, 2006, pp. 1-4 and attachments.

U.S. Appl. No. 10/870,783, Notice of Allowance dated Jun. 13, 2007 (7 pages).

UK Intellectual Property Office Search Report, GB 0511574.6 dated Oct. 19, 2005 (1 page).

UK Intellectual Property Office, Examination Report, GB 0511574.6 dated Jul. 19, 2007 (6 pages).

Translation of Japanese Office Action, JP 2005-173488, Notice of Rejection dated Aug. 5, 2008 (8 pages).

Translation of German Office Action dated Jul. 7, 2006, DE 10 2005023128.4-53 (3 pages).

Translation of German Office Action dated Feb. 7, 2008, DE 10 2005023128.4-53 (6 pages).

Brin, Sergey, et al., "Copy Detection Mechanisms for Digital Documents", Department of Computer Science, Stanford University, Oct. 31, 1994, p. 1-21.

Manber, Udi, "Finding Similar Files in a Large File System," Department of Computer Science, University of Arizona, TR 93-33, Oct. 1993, (11 pages).

Rabin, M.O., "Fingerprinting by Random Polynomials," Technical Report, Center for Research in Computing Technology, Harvard University, 1981, Report TR-15-81 (14 pages).

Korean Intellectual Property Action, International Appl. No. PCT/US2007/022629 Search Report dated Jul. 24, 2008 (2 pages).

Korean Intellectual Property Office, International Appl. No. PCT/US2007/022585 Search Report dated Jul. 15, 2008 (2 pages).

U.S. Appl. No. 12/412,821, Non-Final Rejection dated Sep. 29, 2010, pp. 1-7 and attachments.

U.S. Appl. No. 12/404,842, Non-Final Rejection dated Oct. 19, 2010, pp. 1-8 and attachment.

U.S. Appl. No. 12/412,821, Notice of Allowance dated Mar. 4, 2011, pp. 1-5 and attachments.

U.S. Appl. No. 12/404,842, Notice of Allowance dated Apr. 5, 2011, pp. 1-5 and attachments.

* cited by examiner

LANDMARK CHUNKING OF LANDMARKLESS REGIONS

BACKGROUND

Computer systems and networks have evolved towards more efficient systems and faster networks. As a result, computer systems have larger memories for storing information such as data files and application programs, and computer networks have greater bandwidth for transmitting information. As the amount of information to be stored and transmitted continues to increase, the efficiency and speed of the computer systems and networks can be further improved by more efficiently and rapidly storing, retrieving and transmitting the information. Various systems and methods have been developed to carry out the efficient and rapid processing of the information. The systems and methods may use chunking algorithms to achieve improved efficiency and speed.

Chunking algorithms partition data composed of a sequence of bytes into nonoverlapping chunks. Landmark chunking algorithms determine partitioning by using landmarks present in the data as chunk dividing points. Landmarks are local patterns of data around a point. For example, a landmark might be considered any point in a data stream immediately following a newline character. Landmark chunking a text file using the newline character as the landmark definition would partition the text file into a sequence of chunks, where each line of the text file is a separate chunk. Landmark definitions that are actually used in practice tend to be more complicated to enable proper handling of file types other than text files. For example, a point can be defined as a landmark if the immediately preceding 48 bytes have a Rabin fingerprint equal to −1 mod a prespecified number related to the average desired chunk size.

Landmark chunking algorithms have many advantages. Perhaps the most useful is that local changes only disturb a small number of chunks. For example, in a text file example adding a word to one line in the middle of the document only disturbs that chunk, whereas simple division of the text file into fixed-size 80 character records causes every record after the added word to be different. Landmark chunking algorithms are thus especially suited for compacting related data by keeping only one copy of each chunk.

SUMMARY

Embodiments of a computer-executed method and associated system improve efficiency of landmark chunking in data regions without landmarks. A computer-executed method for forming data chunks from a sequence of data values comprises determining whether processing of the sequence of data values has entered a region that is landmark-free. If processing of the data value sequence has entered a landmark-free region, a data chunk is produced using a specialized landmark chunking technique that is specialized for landmark-free regions. Otherwise, the method comprises producing a data chunk using a standard-data landmark chunking technique.

BRIEF DESCRIPTION OF THE DRAWINGS

Embodiments of the invention relating to both structure and method of operation may best be understood by referring to the following description and accompanying drawings.

DETAILED DESCRIPTION

Figure 1A:
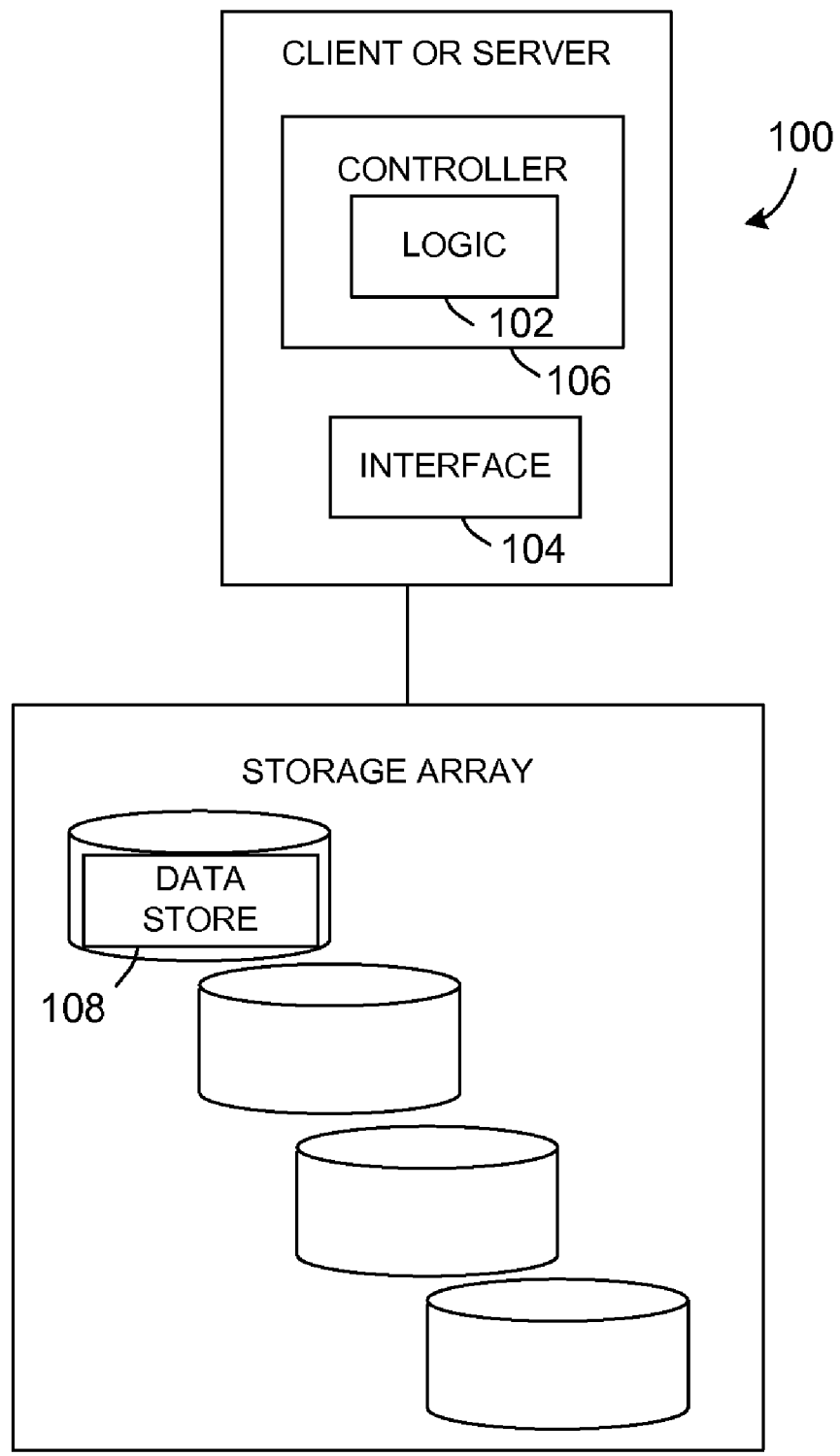
FIGS. 1A and 1B are schematic block diagrams showing embodiments of data processing systems that improve efficiency of landmark chunking in data regions devoid of landmarks.

Embodiments of systems and methods are disclosed which improve speed performance of landmark chunking of regions devoid of landmarks.

Backup and archiving processes, which can use landmark chunking for compaction, must run at very high speeds to keep up with the large amount of data that is generated each day in a typical enterprise. Accordingly, landmark chunking that runs as fast as possible is highly desirable.

Useful landmark chunking algorithms produce chunks with a minimum and maximum size. The minimum size limits per chunk overhead and the maximum size limits the buffer size that is sufficient to handle a single chunk. Because of the existence of the minimum size, useful landmark chunking algorithms usually begin monitoring for landmarks only a minimum size number of bytes after the end of the last chunk, where the minimum size is the specified smallest allowed chunk size. That is, an algorithm can save execution time by disregarding the first minimum size number of bytes of each chunk. Savings can be considerable if checking for a landmark is computationally expensive, for example the computation of Rabin fingerprints, because landmark checking would otherwise be done for every byte of the input data, which is often of the size of terabytes or petabytes. The savings depends on the size of the chunks. Smaller chunks save more because the skipped portion is a larger portion of the bytes in the chunk.

Existing useful Landmark chunking algorithms thus run substantially faster when landmarks occur frequently because the data immediately after a landmark chunk boundary does not have to be inspected. Specifically, a minimum chunk size exists so that the chunking algorithm can disregard landmarks that occur too close to the beginning of a chunk since such landmarks cannot be a chunk boundary. The larger a chunk, the more data is inspected, causing regions without landmarks, which produce only maximum size chunks, to chunk substantially slower than regions with a typical or common distribution of landmarks. The illustrative systems and techniques enable all regions to chunk as fast as regions with a normal distribution of landmarks.

Although the definition of landmarks is generally chosen carefully so that in normal data, landmarks occur about every N bytes, where N is the desired average size of the chunk, in rare cases no landmarks may be present for very long sections of data. For example, in the case of an algorithm that computes a Rabin fingerprint, very large data regions filled with zeros will result in large landmark-free sections. Chunking performance in such cases can be quite poor because the chunking algorithm produces only maximum size chunks since no landmarks exist to produce shorter chunks.

In a specific example of a chunking application, a chunking algorithm can use the Rabin fingerprint scheme with parameters including a minimum chunk size of approximately 1,500 bytes, an average chunk size of about 4,000 bytes, and a maximum chunk size of approximately 10,000 bytes. The chunking algorithm calculates about 3,500 fingerprints for the average chunk, and about 8,500 fingerprints for the maximum size chunk, approximately 3.4 times as many calculations. When many of the maximum-size chunks appear in sequence, the effective performance of the chunker drops by a factor of 3.4.

A landmark chunking algorithm with improved performance is highly useful since patterns that cause landmark-free regions occur in real-world data, such as large strings of zeroes found in pre-allocated database files. Various operational conditions, for example load balancing between components, can benefit from improved minimum speed of chunking for data that can include regions without landmarks.

Landmark chunking is normally performed in a linear manner, from left to right along the input data sequence. Processing proceeds along the data sequence, generating chunks through the progression. Many other variations are possible. For example, chunks can be generated from right to left.

The disclosed systems and techniques are proposed to enable landmark chunking algorithms to run as fast on regions without landmarks as the algorithms perform on normal data. The improved performance in landmark-free regions is attained without giving up the speed that results from the skipping-leading-chunk-data optimization.

To improve performance on landmark-free regions, the systems and techniques disclosed herein detect when such a region is reached using one or more of several techniques.

Embodiments of the illustrative system can execute any suitable standard-data landmark chunking algorithm (that is, one that may perform substantially slower on landmark-free regions), performing chunking as usual until a region without landmarks, which can be called a landmark-free region, is detected. One example of a suitable standard-data landmark chunking algorithm is disclosed in U.S. Pat. No. 7,269,689, "System and Method for Sharing Storage Resources between Multiple Files," to Eshghi et al., and describes a two-threshold two-divisor algorithm. The systems and techniques disclosed herein use various methods for detecting landmark-free regions.

Once the start of a landmark-free region is detected, one or more data chunks can be produced using a technique that is more efficient for landmark-free regions. Once exit from the landmark-free region is detected, data chunks can be produced using a standard-data landmark chunking algorithm.

Referring to FIG. 1A, a schematic block diagram illustrates an embodiment of a data processing apparatus 100 configured to improve efficiency of landmark chunking in data regions devoid of landmarks. The illustrative data processing apparatus 100 comprises a logic 102 that forms data chunks from a sequence of data values by determining whether processing of the sequence of data values has entered a landmark-free region. If entering a landmark-free region, the logic 102 produces a data chunk using a specialized landmark chunking technique that is specialized for landmark-free regions. The logic 102 otherwise produces a data chunk using a standard-data landmark chunking technique. "Standard-data" is defined herein as a region in the data sequence that includes landmarks.

The data processing system 100 can be configured as a data storage system that further comprises an interface 104 that receives the sequence of data values, and a controller 106 coupled to the interface 104 that operates the logic 102. A data store 108 coupled to the controller 106 stores the data chunks.

Several different techniques can be used to determine whether processing of the sequence of data values has entered a landmark-free region.

In an illustrative embodiment, a method of detecting entry into a region devoid of landmarks can involve checking the length of each new chunk after determining chunk boundaries. If D consecutive chunks are all maximum length chunks where D is a parameter, for example three, entry into a sizable landmark-free region can be assumed.

Checking only after producing each chunk is substantially faster than trying to inspect bytes as the chunking algorithm proceeds, for example by monitoring to determine whether data includes a large number (such as 30,000) consecutive zeros, and is insensitive to details of the data. Parameter D can be selected as a number greater than 2 to reduce false positives. Chunk lengths of normal data are approximately in a normal distribution so a chance always exists of detecting one or (less likely) two maximum length chunks in a row. A sufficiently high setting of parameter D results in a very low probability that normal data is mistaken for a large region devoid of landmarks. A disadvantage of setting parameter D to a relatively high number is excessive time expended in even noticing a landmark-free region.

Accordingly, an embodiment of a computer-executed system 100 can include logic 102 that determines whether processing of the sequence of data values has entered a landmark-free region by checking the lengths of one or more data chunks produced using the standard-data landmark chunking technique, and determining whether the chunk lengths of the one or more data chunks produced using the standard-data chunking technique are all equal to a predetermined maximum length. The logic 102 determines that processing has entered into the landmark-free region for a condition that the one or more data chunks produced using the standard-data landmark chunking technique are maximum length chunks.

One example of a specialized landmark chunking technique that is efficient for regions devoid of landmarks operates by (a) producing the next chunk as a maximum length fixed size chunk, which can be performed extremely fast by simple arithmetic without any need to inspect the data itself. The standard-data chunking algorithm can be run (b) as a subroutine to produce one chunk. If the one chunk has the maximum length (c), then execution loops back to (a). Otherwise the specialized algorithm exits and the standard-data landmark chunking algorithm is again run.

Figure 5:
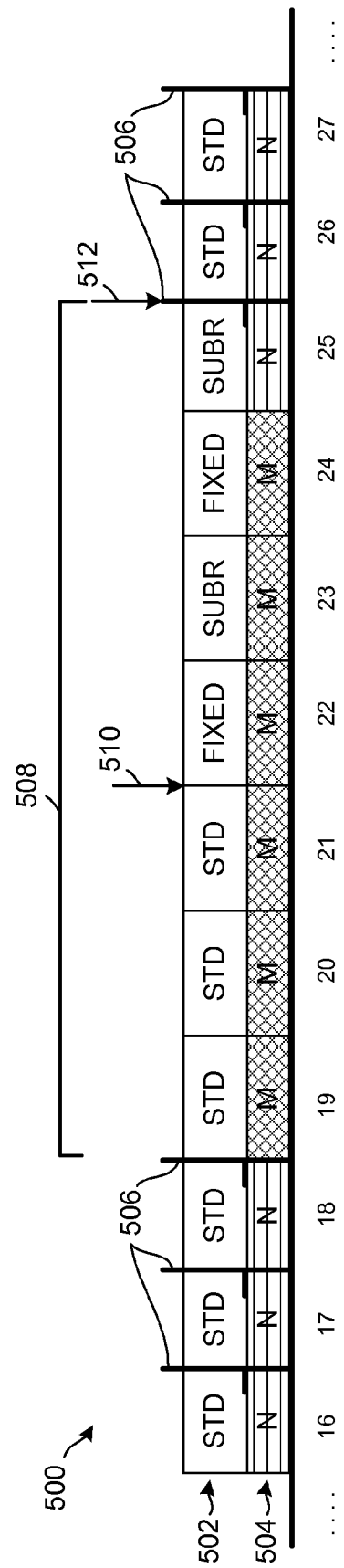
FIG. 5 is a graphic diagram illustrating example operation of the specialized landmark chunking technique.

FIG. 5 is a graphic diagram illustrating example operation of the specialized landmark chunking embodiment during chunking up of a sequence 500 of data values, with landmarks 506. Note the sizable landmark-free region 508. Processing proceeds from left to right, generating a sequence 504 of chunks (arbitrarily labeled as 16 through 27) including maximum length chunks (labeled M) and non-maximum length chunks (labeled N).

Shown in row 502 is the method used to produce each chunk. Initially no determination is made that processing has entered a landmark-free region (that is, the previous three chunks produced are not maximal chunks and are not produced by the specialized landmark chunking technique), chunks are produced by a first standard-data landmark chunking algorithm (denoted by STD). At point 510 (after producing chunk 21), a determination is made that processing has entered a landmark free region because the previous three chunks (19-21) are maximal. Accordingly, the specialized landmark chunking technique is invoked.

The specialized landmark chunking technique first produces a maximal chunk 22 by simple arithmetic without inspecting the data underlying chunk 22 (this method of producing chunks is denoted FIXED). Next, the specialized landmark chunking technique produces a chunk 23 using a standard-data landmark chunking algorithm as a subroutine (denoted SUBR). This may be the same standard-data landmark chunking algorithm as the first standard-data landmark chunking algorithm. Because the produced chunk 23 is maximal, the specialized landmark chunking technique loops and once again produces a chunk 24 using FIXED and a chunk 25 using SUBR. Because chunk 25 is not maximal, the specialized landmark chucking technique exits at point 512 and production of chunks (26, 27) using STD is resumed.

As long as processing remains in a landmark-free region, the standard-data landmark chunking algorithm is run at a 50% duty cycle and is thus twice as fast for landmark-free regions. The duty cycle can be adjusted as desired to ensure that this disclosed specialized landmark chunking technique runs as fast on landmark-free regions as the underlying standard-data landmark chunking algorithm on normal data. For example, the duty cycle can be implemented as two fixed cycles followed by one underlying, standard-data algorithm cycle, or three fixed cycles followed by two underlying, standard-data algorithm cycles, and the like. With high probability, once the landmark-free region is exited, the next time the standard-data landmark chunking algorithm is run as a subroutine by the specialized landmark chucking technique, it will produce a chunk of less than maximum length, and the specialized landmark chunking technique will exit.

The combined algorithm, which includes the standard-data landmark chunking technique in cooperation with the specialized landmark chunking technique, can produce a small number of different sized chunks when exiting a landmark-free region because the end of the region is not detected until the standard-data landmark chunking algorithm is run. Chunking algorithms automatically resynchronize with one another within a few chunks on normal data. The different sized chunks slightly reduce the possible obtained compaction and can be considered a cost of using the specialized landmark chunking technique. Landmark-free regions, although possibly large, are likely to be rare so the cost is typically very low. False positives for the beginnings of landmark-free regions, which are very rare for a reasonable selection of parameter D, also produce a small number of different sized chunks.

Various data processing systems 100 can implement one or more of several different techniques for performing specialized landmark chunking, which is specialized for regions in the data sequence with no landmarks. The specialized landmark chunking techniques can be associated with particular techniques for detecting the landmark-free region.

A first example technique for performing specialized landmark chunking is depicted which can be implemented in combination with the technique for determining whether processing of the sequence of data values has entered a landmark-free region based on the chunk length of consecutive last determined data chunks. In an illustrative data processing system 100, the logic 102 can produce a data chunk using the specialized landmark chunking technique that is specialized for landmark-free regions by producing the selected number of consecutive chunks as maximum-length chunks without inspecting underlying data, producing a selected number of consecutive chunks as maximum-length chunks, and producing a first chunk following the maximum-length chunks using the standard-data landmark chunking technique. The logic 102 determines whether the first chunk has length equal to a predetermined maximum length, and if the first chunk length is equal to the predetermined maximum length the logic loops to produce the selected number of consecutive chunks as maximum-length chunks without inspecting the underlying data.

A second example technique for performing specialized landmark chunking can also be implemented in combination with the technique for determining whether processing of the sequence of data values has entered into a landmark-free region based on the chunk length of consecutive most recently produced data chunks. In some implementations or selected conditions, a simple technique can be used as a specialized landmark chunking technique. For example, the logic 102 can produce a data chunk using the specialized landmark chunking technique that is specialized for landmark-free regions by producing the selected number of consecutive chunks as maximum-length chunks without inspecting underlying data, for example by arithmetic computation rather than data inspection. The logic 102 then returns to producing data chunks using the standard-data landmark chunking technique, thus exiting the specialized landmark chunking technique.

A third example technique for performing specialized landmark chunking can also be implemented in combination with the technique for determining whether processing of the sequence of data values has entered a landmark-free region based on the chunk length of consecutive most recently produced data chunks. In an example configuration, the logic 102 produces a data chunk using the specialized landmark chunking technique that is specialized for landmark-free regions by producing one chunk as a maximum-length chunk without inspecting the underlying data, such as by arithmetic computation wherein the data is not inspected. The logic 102 checks data of a predetermined maximum length immediately following the produced one chunk for characteristics of landmark-free regions. If the checked data is characteristic of landmark-free regions, the logic 102 loops to produce one maximum-length chunk step. Thus, a sequence of maximum-length chunks is continuously produced a so long as the checked data is characteristic of landmark-free regions. Otherwise, the logic 102 returns to executing standard-data landmark chunking.

Techniques in addition to analysis of landmark boundaries and associated chunk size can be used to determine whether processing of the data sequence has entered a region that is devoid of landmarks. Accordingly, in a second example method for determining whether processing of the sequence of data values has entered a landmark-free region, a hash function can be computed to determine whether the data has a landmark-free character.

A hash that is sufficiently fast can be used to detect the beginning of a landmark-free region, either executing in parallel with the standard-data landmark chunking algorithm or executed before running the standard-data algorithm to produce a chunk. A hash is computed on the first maximum length number of bytes of the data. If the hash matches a value known to belong to a landmark-free chunk, for example a chunk of all zeros, then the normal algorithm can be aborted or skipped and a maximum-length fixed-length chunk is produced. In another example implementation, the hashing method can be used as part of a specialized landmark chunking technique with the technique exiting once the hash no longer matches, thereby avoiding computing the hash for normal data.

Data can be analyzed for the presence of landmarks by performing a hash function. A hash is any defined procedure or mathematical function for converting data into a relatively small integer, which can be called a hash value, hash code, hash sum, hash, or the like. Accordingly, the computer-executed system 100 can comprise logic 102 that determines whether a region in the sequence of data values is landmark-free by computing a hash function on a selected portion of the sequence of data values, comparing the computed hash function to one or more values known to represent landmark-free data chunks, and classifying a region as landmark-free for a determination that the computed hash function matches one of these values.

Some standard-data landmark chunking algorithms function by computing a "fingerprint" for a sequence of data. One well-known algorithm is Rabin's fingerprint algorithm which may be used to improve chunking efficiency and is disclosed by M. O. Rabin, *Fingerprinting by Random Polynomials*, Tech. Rep. TR-15-81, Center for Research in Computing Technology, Harvard University, Cambridge, Mass., 1981.

In an example embodiment, the computer-executed system 100 can comprise logic 102 that produces data chunks using a specialized landmark chunking technique that computes fingerprint values and is specialized for landmark-free regions. The logic 102 computes fingerprint values for positions in the sequence of data values including computing a first fingerprint value for a first window of bytes in the sequence of data values. The logic 102 determines whether a second window of bytes is same as the first window of bytes and assigns the first fingerprint value to the second window of bytes without fingerprint computation if the second window of bytes is the same as the first window of bytes. Otherwise, the logic 102 computes a second fingerprint value for the second window of bytes.

In a specific embodiment, a standard-data landmark chunking algorithm can find landmarks present in data and use the landmarks as chunk boundaries by partitioning data composed of a sequence of bytes into non-overlapping chunks. The data can be partitioned by computing fingerprint values for positions in the data, detecting landmarks in the data based on the fingerprints, and setting boundaries according to the detected landmarks.

Another example technique for performing specialized landmark chunking uses a specially modified version of a standard data landmark chunking algorithm that runs slower on standard data but faster (than otherwise) on some landmark-free regions. Chunks are produced using the modified landmark chunker until a chunk not of maximal size is produced, wherein the specialized landmark chunking technique exits.

One way to build such a specially modified algorithm is to modify a standard data landmark chunking algorithm that uses fingerprinting so that the fingerprinting code runs faster on regions of repeated bytes (for example, all zeros). As the algorithm scans forward, the most recently seen data byte is monitored along with how many times the data byte has occurred in a row. As long as the number of repetitions is less than the size of the window being fingerprinted, fingerprinting proceeds as normal. Once the number of repetitions exceeds the fingerprint window size, fingerprints no longer need be calculated because the underlying data being fingerprinted (for example, the last 48 bytes) has not changed. In this way, few fingerprints need be calculated for regions containing many repeated bytes. Because fingerprinting is expensive, the modified algorithm runs faster than otherwise on regions of repeated bytes.

Figure 1B:
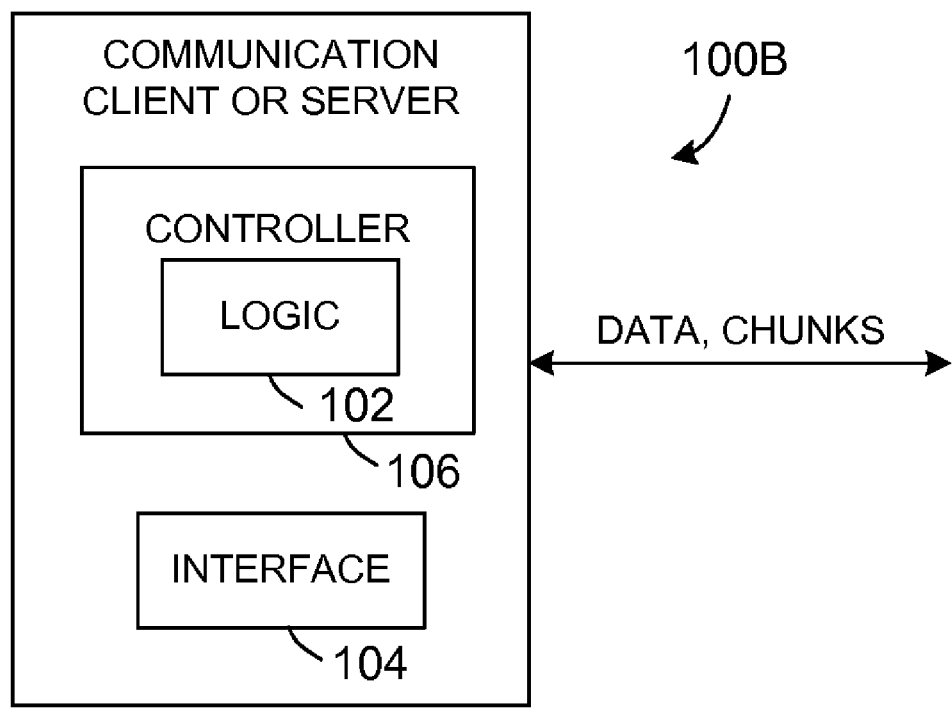

Referring to FIG. 1B, a data processing system 100B can be configured as a communication system which can perform the various techniques disclosed herein and further comprises a controller 106 that operates the logic 102, and a communication interface 104 that communicates the sequence of data values and the data chunks.

Figure 2:
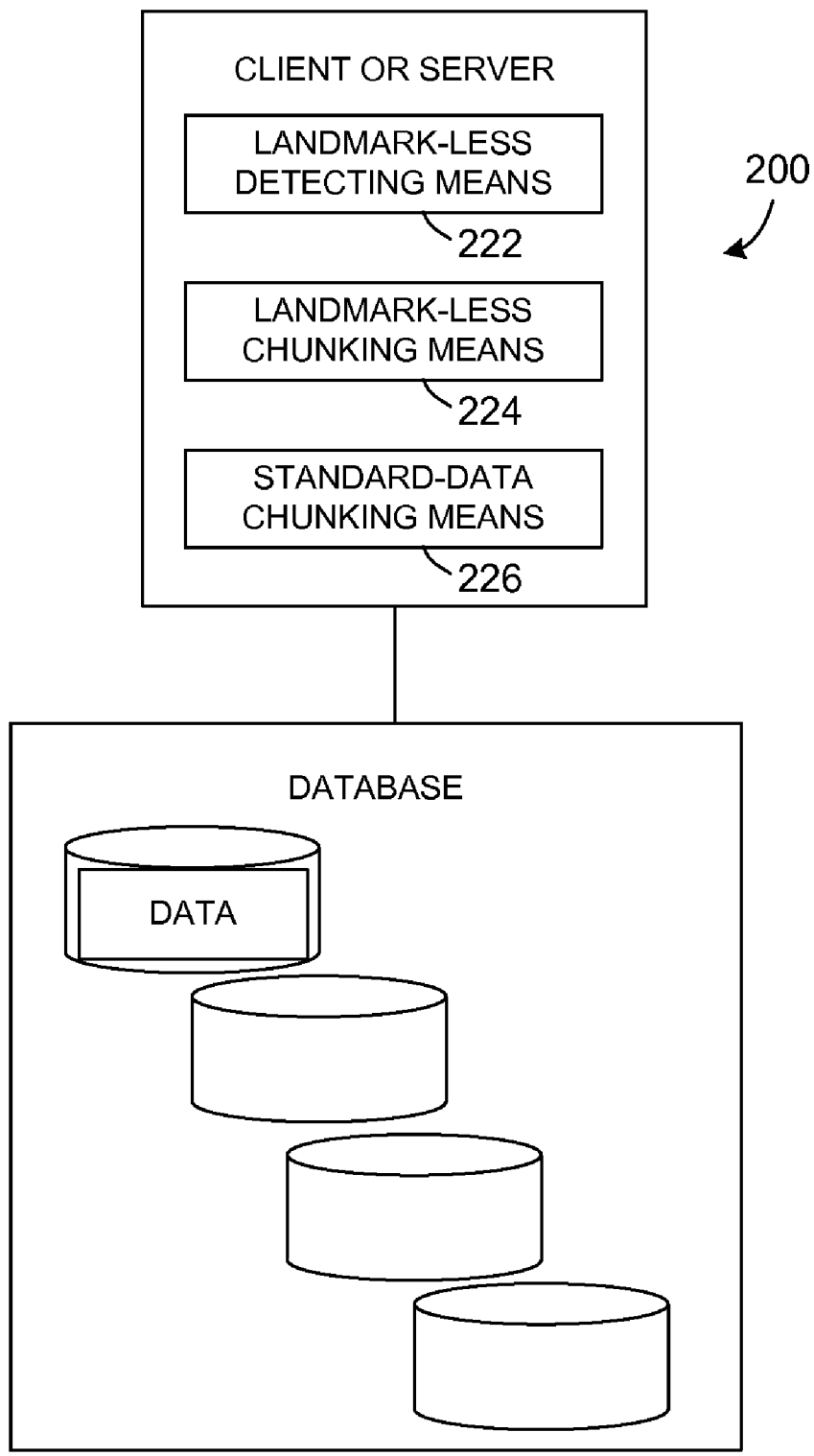
FIG. 2 is a schematic block diagram depicting another embodiment of a data processing apparatus that improves efficiency of landmark chunking in data regions without landmarks.

Referring to FIG. 2, a schematic block diagram illustrates an embodiment of a data processing apparatus 200 that improves efficiency of landmark chunking in data regions without landmarks. The data processing apparatus 200 forms data chunks from a sequence of data values. The computer-implemented system 200 can comprise means 222 determining whether processing of the sequence of data values has entered a landmark-free region. The data processing apparatus 200 further comprises means 224 for producing a data chunk using a specialized landmark chunking technique that is specialized for landmark-free regions if the region is landmark-free, and means 226 for producing a data chunk using a standard-data landmark chunking technique.

Figure 3:
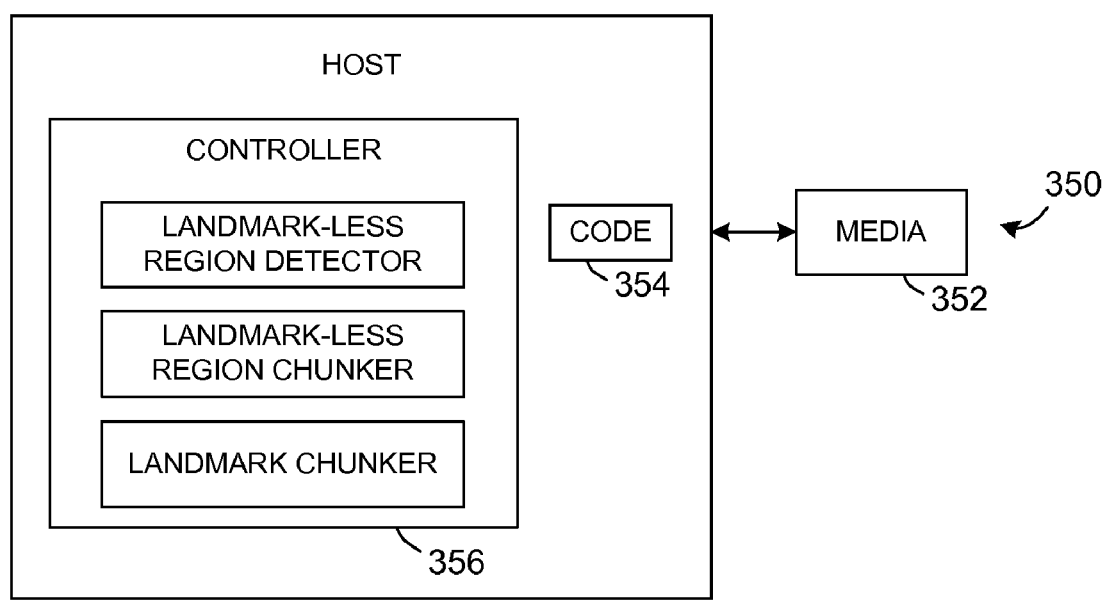
FIG. 3 is a schematic block diagram illustrating an embodiment of an article of manufacture that implements technique for improving efficiency of landmark chunking in data regions without landmarks.

Referring to FIG. 3, a schematic block diagram depicts an embodiment of an article of manufacture 350 that implements a technique for improving the efficiency of landmark chunking in data regions without landmarks. The illustrative article of manufacture 350 comprises a controller-usable medium 352 (or computer-usable medium) having a computer readable program code 354 embodied in a controller 356 for performing data chunking wherein data chunks are formed from a sequence of data values. The computer readable program code 354 causes the controller 356 to determine whether processing of the sequence of data values has entered a landmark-free region and produce a data chunk using a specialized landmark chunking technique that is specialized for landmark-free regions. The program code 354 further causes the controller 356 to produce a data chunk using a standard-data landmark chunking technique.

Figure 4A:
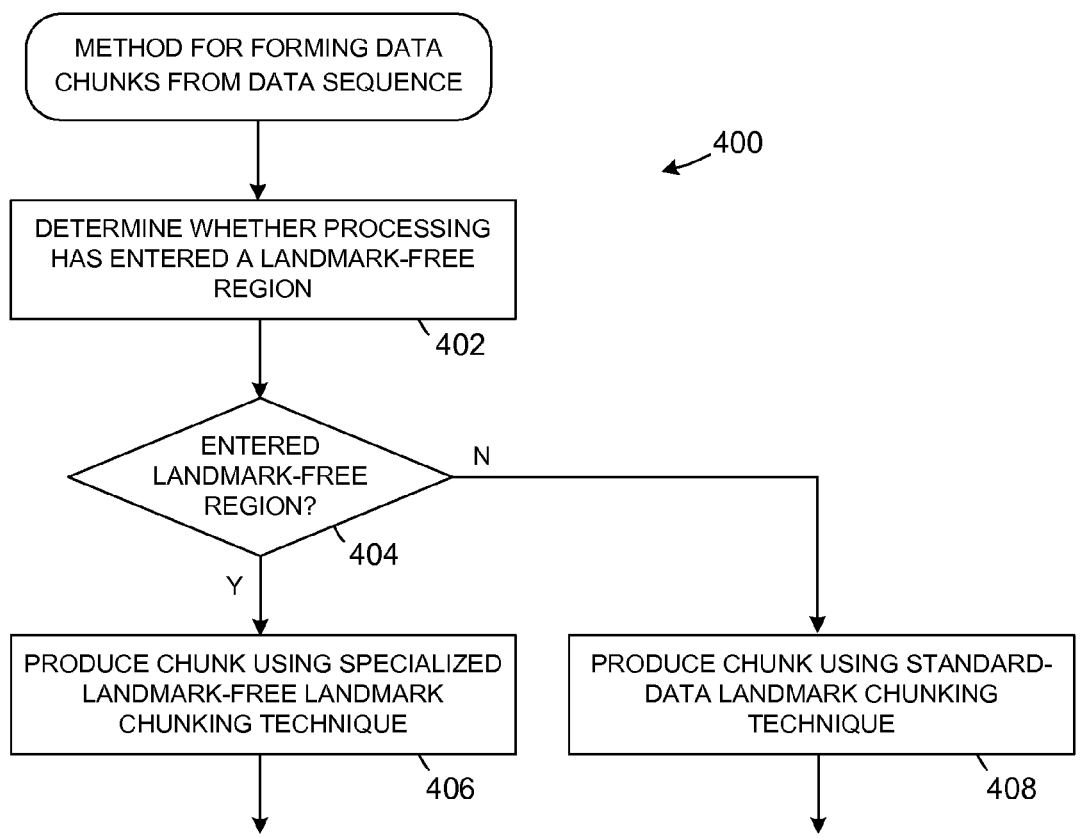
FIGS. 4A through 4G are flow charts showing one or more embodiments or aspects of a computer-executed method that improves efficiency of landmark chunking in data regions without landmarks.

Referring to FIGS. 4A through 4G, flow charts illustrate one or more embodiments or aspects of a computer-executed method that improves efficiency of landmark chunking in data regions without landmarks. FIG. 4A depicts a computer-executed method 400 for forming data chunks from a sequence of data values. The illustrative method comprises determining 402 whether processing of the sequence of data values has entered a landmark-free region. If determined to have entered a landmark-free region 404, a data chunk is produced 406 using a specialized landmark chunking technique that is specialized for landmark-free regions. Otherwise, the method comprises producing 408 a data chunk using a standard-data landmark chunking technique.

Figure 4B:
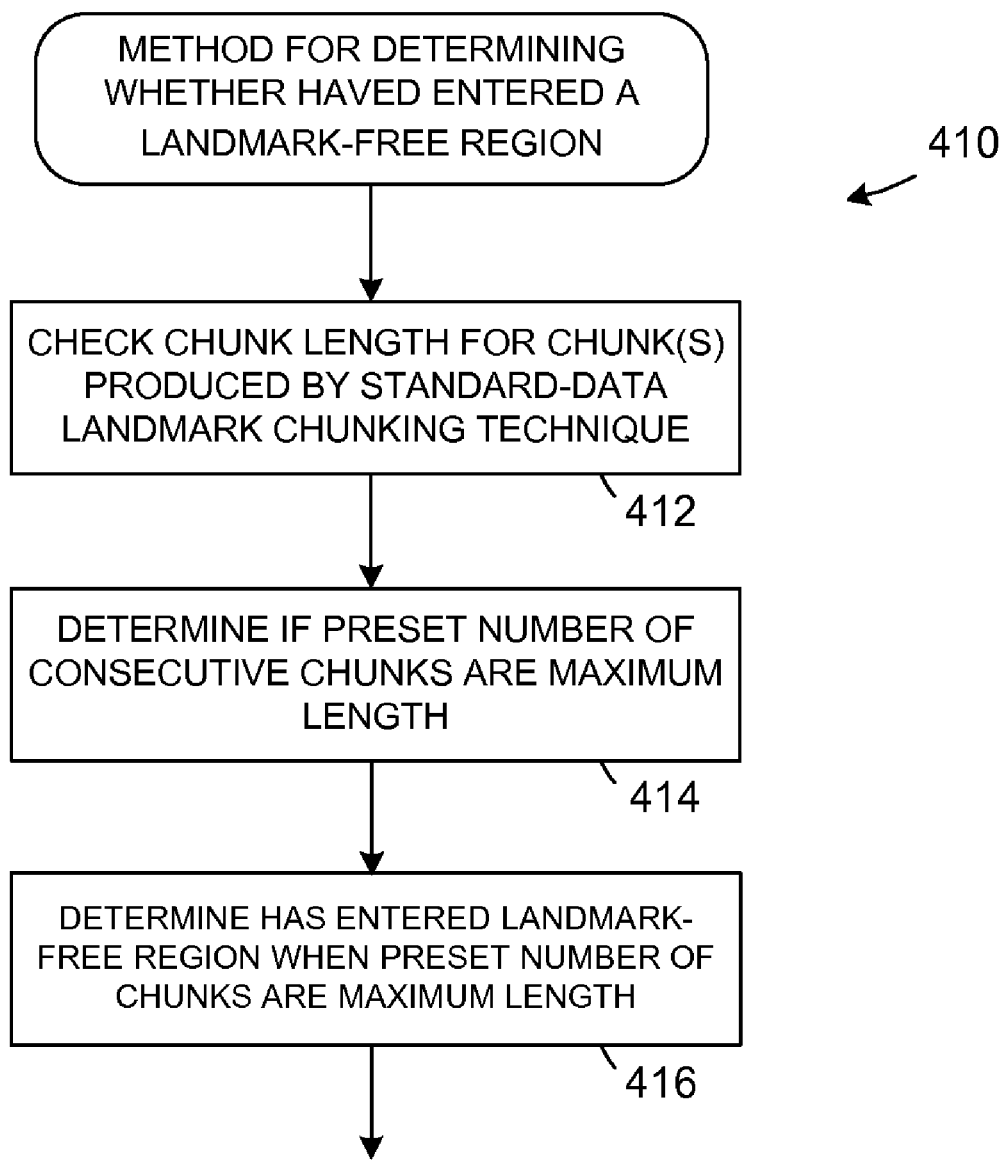

Several techniques can be used to determine 402 whether processing of the sequence of data values has entered a landmark-free region. A first example method 410 for determining whether processing of the sequence of data values has entered a landmark-free region is depicted in FIG. 4B and comprises checking 412 chunk lengths for one or more data chunks that are produced using the standard-data landmark chunking technique, and determining 414 whether a predetermined number of consecutive most recently produced data chunks have chunk lengths equal to a predetermined maximum length. A determination can be made 416 that processing has entered a landmark-free region in the case of determination that the one or more data chunks produced using the standard-data landmark chunking technique are maximum length chunks. For example, if the most recent D data chunks in a row are all maximum length chunks, where D is a parameter such as three, an assumption can be made that processing has entered into a sizeable landmark-free region.

Various different techniques can be used to perform specialized landmark chunking that is specialized for regions in the data sequence with no landmarks. The specialized landmark chunking techniques can be associated with particular techniques for detecting entry into the landmark-free region.

Figure 4C:
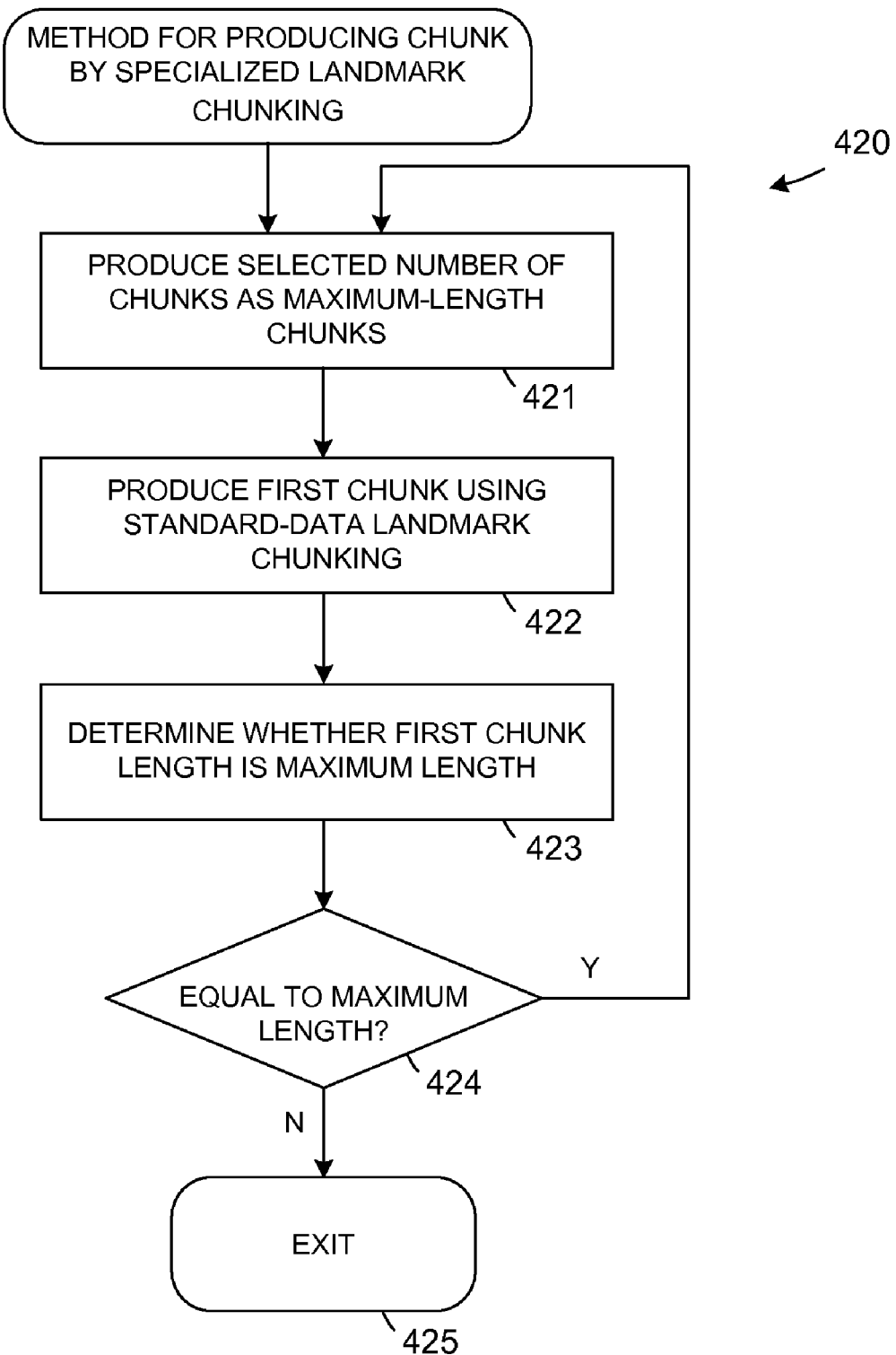

A first example technique for performing specialized landmark chunking is depicted in FIG. 4C and can be implemented in combination with the technique for determining whether processing of the sequence of data values has entered a landmark-free region shown in FIG. 4B. Producing 420 a data chunk using the specialized landmark chunking technique that is specialized for landmark-free regions can comprise producing 421 the selected number of consecutive chunks as maximum-length chunks by arithmetic computation without inspection of data. After the selected number of consecutive chunks are produced, a first chunk is produced 422 using a standard-data landmark chunking technique, and determination is made 423 of whether the first chunk has length equal to a predetermined maximum length. If the first chunk length is equal 424 to the predetermined maximum length, the technique loops to producing 421 the selected number of consecutive chunks as the maximum-length chunks. Otherwise, the first chunk length is less than the predetermined maximum length and the method exits 425.

Figures 4D, 4E:
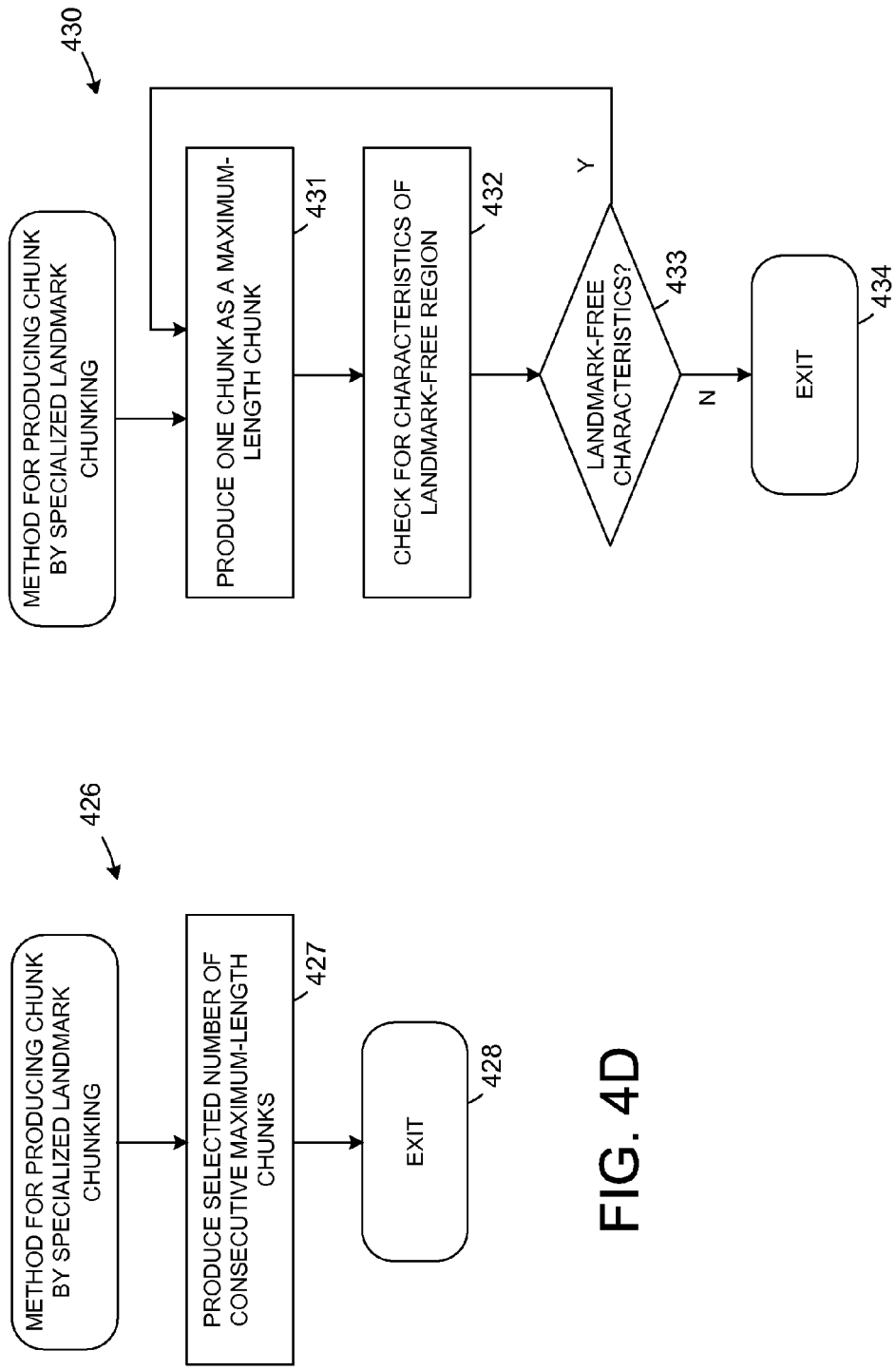

A second example technique for performing specialized landmark chunking is depicted in FIG. 4D and can be implemented in combination with the technique for determining whether processing of the sequence of data values has entered a landmark-free region based on the chunk length of consecutive most recently produced data chunks. A method 426 for producing a data chunk using a specialized landmark chunking technique that is specialized for landmark-free regions can comprise producing 427 a selected number of consecutive chunks as maximum-length chunks by arithmetic computation in lieu of data inspection. After the maximum-length chunks are produced 427, the method exits 428.

An example simple specialized landmark chunking algorithm can function by (a) producing the next three chunks as maximum length chunks, (b) exiting the specialized algorithm. The simple specialized algorithm used in combination with a selection of parameter D of 3, also results in a 50% duty cycle, but is slower to detect when the landmark-free region ends, and thus produces more different chunks.

Accordingly, after determining processing has entered into a landmark-free region, a specialized technique can produce the next three consecutive chunks as maximum-length chunks by arithmetic computation wherein the data is not inspected.

A third example technique for performing specialized landmark chunking is depicted in FIG. 4E, which can be implemented in combination with the technique for determining whether processing of the sequence of data values has entered a landmark-free region based on the chunk length of the last K consecutive last determined data chunks. Producing 430 a data chunk using a specialized landmark chunking technique that is specialized for landmark-free regions can comprise producing 431 one chunk as a maximum-length chunk by arithmetic computation wherein the data is not inspected, and checking 432 data of a predetermined maximum length immediately following the produced one chunk for characteristics of landmark-free regions. If the checked data is characteristic of landmark-free regions 433, the method loops to producing 431 a maximum-length chunk. Otherwise, the checked data is not characteristic of landmark-free regions 433 and the method exits 434.

In a second example method for determining whether processing of the sequence of data values has entered a landmark-free region, a hash function can be computed to determine whether the data has a landmark-free character.

Figure 4F:
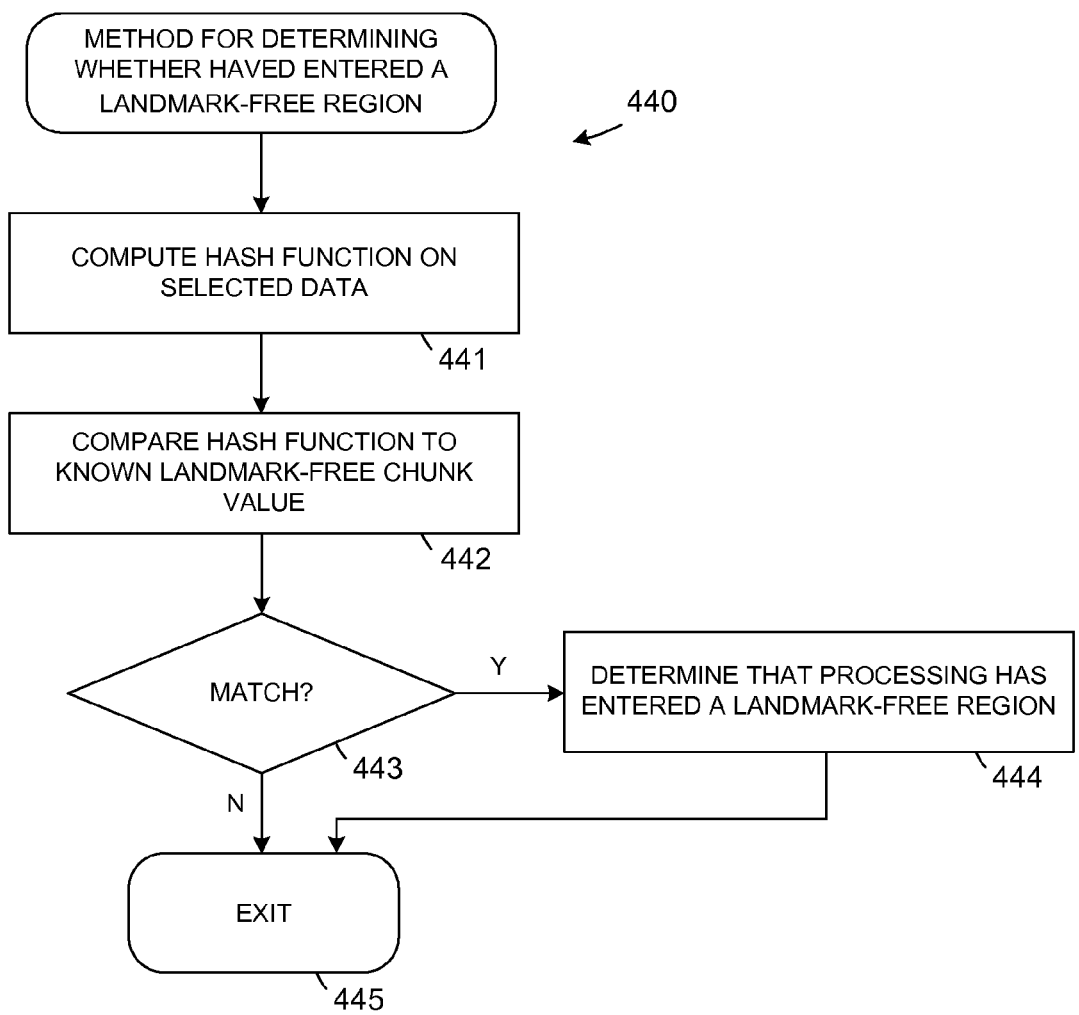

Thus, referring to FIG. 4F, a computer-executed method 440 for determining whether processing of the sequence of data values has entered a landmark-free region can comprise computing 441 a hash function on a selected portion of the sequence of data values, and comparing 442 the computed hash function to a value known to represent a landmark-free data chunk. For a match 443, a determination is made 444 that processing has entered a landmark-free region and processing exits 445.

Figure 4G:
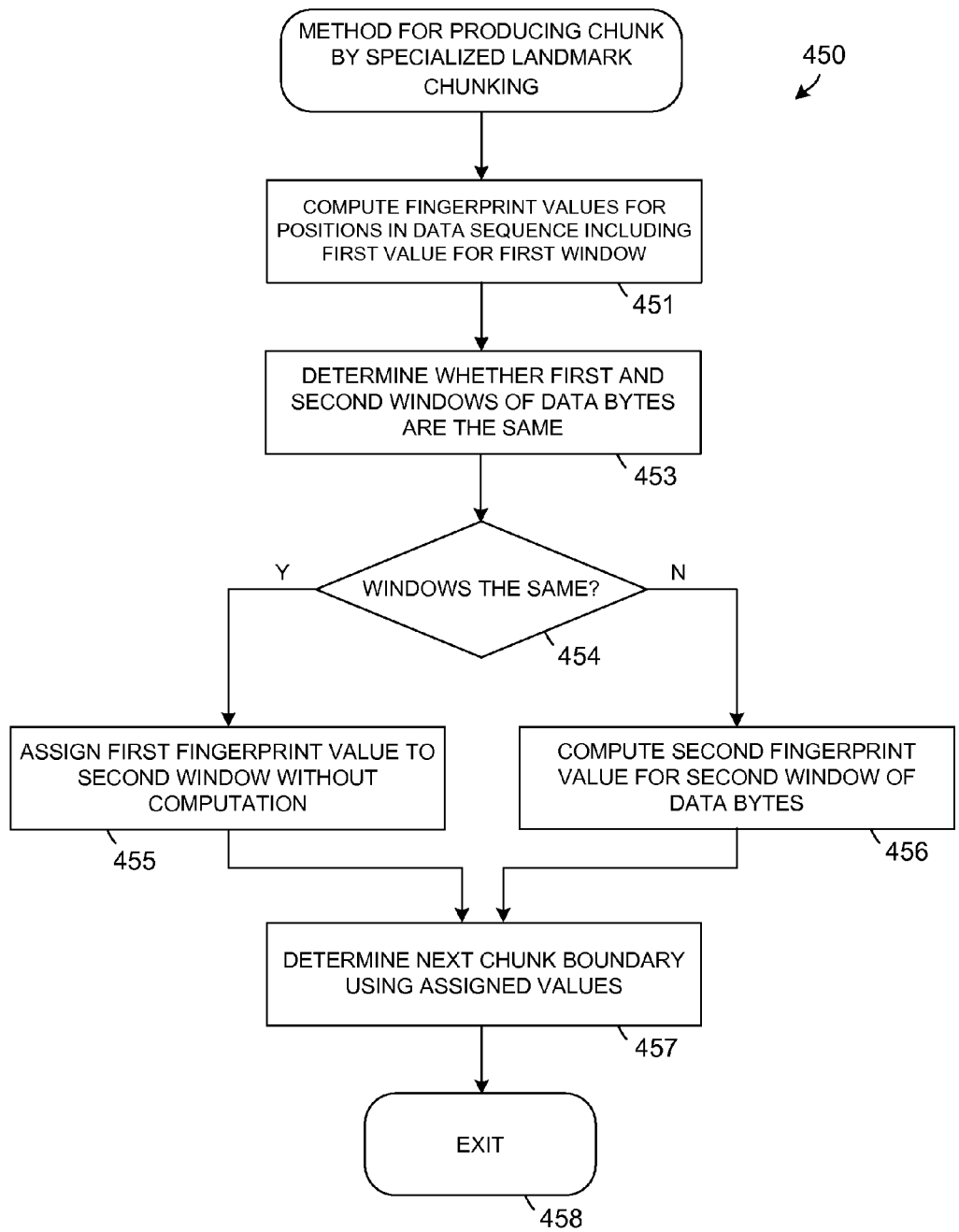

For standard-data landmark chunking algorithms that function by computing a "fingerprint" for a sequence of data, a third example method for performing specialized landmark chunking that is specialized for landmark-free regions functions by computing and analyzing fingerprints to determine chunk boundaries. Referring to FIG. 4G, a method 450 for producing a data chunk using a specialized landmark chunking technique that is specialized for landmark-free regions can comprise computing 451 fingerprint values for positions in the sequence of data values, including computing a first fingerprint value for a first window of bytes in the sequence of data values. The method 450 further comprises determining 453 whether a second window of bytes is same as the first window of bytes (that is, both windows contain the same sequence of bytes), and assigning 455 the first fingerprint value to the second window of bytes without fingerprint computation if the second window of bytes is the same as the first window of bytes 454. Otherwise, a second fingerprint value for the second window of bytes is computed 456 and assigned to the second window of bytes. The assigned values for the first and second windows are then used in part to determine 457 the next chunk boundary. Finally, processing exits 458.

One way of implementing a specialized landmark chunking algorithm is to track the last byte seen and the number of consecutive times the tracked last byte is seen. If the consecutive number exceeds the size of the Rabin window, repeating the expensive Rabin fingerprint computation is superfluous until a different byte is seen. Rabin fingerprints are usually computed on a 48 bytes sliding window by sliding in the byte X; when the window already includes 48 copies of X, this produces no change. Another method of dealing with large regions of repeating bytes includes using a modified standard-data landmark chunking algorithm with such tracking, resulting in somewhat slower speed for normal data, a faster speed for consecutive-byte regions, and quite slow performance for other kinds of landmark-free regions.

Another example specialized landmark chunking algorithm that is optimized for common landmark-free regions can specifically check for large sequences of zeros and omit computing Rabin fingerprints in the region. Typically, such checking is not worth the cost in a standard-data (non-specialized) landmark chunking algorithm.

A standard-data landmark chunking algorithm can be used to detect the end of a landmark-free region. A less general technique can be to check the next maximum chunk length number of bytes for all zeros or other similar patterns. If such a pattern is detected, maximum-length chunks can be continuously produced, enabling a check that is either deterministic (check all bytes) or probabilistic (check only selected bytes, either chosen randomly or predetermined offsets).

The illustrative systems and techniques enable a faster, more speed-consistent chunking algorithm when large landmark-free regions may be present.

Various other techniques can be used for the standard-data landmark chunking algorithm, detection of landmark-free regions, and specialized landmark chunking techniques.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that can be executed as logic in programming that executes in a computer, controller, state machine, and the like as programmed, and may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-executed method for forming data chunks from a sequence of data values comprising:
   determining, by a computer, whether processing of the sequence of data values has entered a region that is landmark-free, wherein the landmark-free region is devoid of any landmarks that provide boundaries of the data chunks;
   producing, by the computer, a data chunk using a specialized landmark chunking technique that is specialized for landmark-free regions in response to determining that the processing of the sequence of data values has entered a landmark-free region; and
   producing, by the computer, a data chunk using a first standard-data landmark chunking technique in response to determining that the processing of the sequence of data values has not entered a landmark-free region.

2. The method according to claim 1 wherein determining whether the processing of the sequence of data values has entered a region that is landmark-free comprises:
   checking chunk lengths of a number of data chunks produced using the first standard-data landmark chunking technique;
   determining whether the chunk lengths of the number of data chunks produced using the first standard-data chunking technique are all equal to a predetermined maximum length; and
   determining that the processing has entered into a landmark-free region in response to detecting that the number of data chunks produced using the first standard-data landmark chunking technique are maximum length chunks.

3. The method according to claim 1 wherein determining whether the processing of the sequence of data values has entered a region that is landmark-free comprises:
   computing a hash function on a selected portion of the sequence of data values;
   comparing the computed hash function to a value known to represent a landmark-free data chunk; and
   determining that the processing of the sequence of data values has entered a region that is landmark-free if the computed hash function matches the value known to represent a landmark-free data chunk.

4. The method according to claim 1, wherein the first standard-data chunking technique identifies landmarks in the sequence of data values, and produces plural data chunks from the sequence of data values using the identified landmarks as boundaries of the plural data chunks.

5. The method according to claim 4, wherein the first standard-data chunking technique is used in a region of the sequence that includes landmarks.

6. A computer-executed method for forming data chunks from a sequence of data values comprising:
   determining, by a computer, whether processing of the sequence of data values has entered a region that is landmark-free;
   producing, by the computer, a data chunk using a specialized landmark chunking technique that is specialized for landmark-free regions if determined that the processing of the sequence of data values has entered a landmark-free region; and
   producing, by the computer, a data chunk using a first standard-data landmark chunking technique,
   wherein producing a data chunk using the specialized landmark chunking technique that is specialized for landmark-free regions comprises using a technique selected from a group consisting of:
   a first technique comprising:
      producing a selected number of consecutive chunks as maximum-length chunks without inspecting underlying data in the sequence of data values;
      producing a first chunk following the maximum-length chunks using a second standard-data landmark chunking technique;
      determining whether the first chunk has a length equal to a predetermined maximum length;
      if the first chunk length is equal to the predetermined maximum length, looping to producing the selected number of consecutive chunks as maximum-length chunks without inspecting the underlying data in the sequence of data values;
   a second technique comprising:
      producing a selected number of consecutive chunks as maximum-length chunks without inspecting underlying data in the sequence of data values; and
   a third technique comprising:
      producing one chunk as a maximum-length chunk without inspecting the underlying data in the sequence of data values;
      checking data of a predetermined maximum length immediately following the produced one chunk for characteristics of landmark-free regions;

if the checked data has characteristics of landmark-free regions, looping to producing one maximum-length chunk.

7. A computer-executed method for forming data chunks from a sequence of data values comprising:
determining, by a computer, whether processing of the sequence of data values has entered a region that is landmark-free;
producing, by the computer, a data chunk using a specialized landmark chunking technique that is specialized for landmark-free regions if determined that the processing of the sequence of data values has entered a landmark-free region; and
producing, by the computer, a data chunk using a first standard-data landmark chunking technique,
wherein producing a data chunk using the specialized landmark chunking technique that is specialized for landmark-free regions comprises:
computing fingerprint values for positions in the sequence of data values;
computing a first fingerprint value for a first window of bytes in the sequence of data values;
determining whether a second window of bytes is same as the first window of bytes; and
assigning the first fingerprint value to the second window of bytes without fingerprint computation on the bytes in the second window if the second window of bytes is the same as the first window of bytes, otherwise computing a second fingerprint value for the second window of bytes.

8. A data processing apparatus comprising:
a computer; and
a logic executable in the computer to:
form data chunks from a sequence of data values including:
determining whether processing of the sequence of data values has entered a landmark-free region, wherein the landmark-free region is devoid of any landmarks that provide boundaries of the data chunks,
in response to the logic determining that the processing has entered a landmark-free region, produce a data chunk using a specialized landmark chunking technique that is specialized for landmark-free regions, and
in response to the logic determining that the processing has not entered a landmark-free region, produce a data chunk using a first standard-data landmark chunking technique.

9. The data processing apparatus according to claim 8 further comprising:
an interface coupled to the computer and configured to receive the sequence of data values; and
a data store coupled to the computer.

10. The data processing apparatus according to claim 8 wherein the determining of whether the processing of the sequence of data values has entered a landmark-free region comprises:
checking chunk lengths of a number of data chunks produced using the first standard-data landmark chunking technique,
determining whether the chunk lengths of the number of data chunks produced using the first standard-data chunking technique are all equal to a predetermined maximum length, and
determining that the processing has entered into the landmark-free region in response to detecting that the number of the data chunks produced using the first standard-data landmark chunking technique are maximum length chunks.

11. The data processing apparatus according to claim 8 wherein the specialized landmark chunking technique produces a selected number of consecutive chunks as maximum-length chunks without inspecting underlying data in the sequence of data values,
produces a first chunk following the maximum-length chunks using a second standard-data landmark chunking technique,
determines whether the first chunk has a length equal to a predetermined maximum length,
if the first chunk length is equal to the predetermined maximum length the logic loops to produce the selected number of consecutive chunks as maximum-length chunks without inspecting the underlying data in the sequence of data values.

12. The data processing apparatus according to claim 8 wherein the specialized landmark chunking technique produces a selected number of consecutive chunks as maximum-length without inspecting underlying data in the sequence of data values.

13. The data processing apparatus according to claim 8 wherein the specialized landmark chunking technique produces one chunk as a maximum-length chunk without inspecting underlying data in the sequence of data values,
checks data of a predetermined maximum length immediately following the produced one chunk for characteristics of landmark-free regions,
if the checked data has characteristics of landmark-free regions, loops to produce one maximum-length chunk.

14. The data processing apparatus according to claim 8 wherein the determining of whether the processing of the sequence of data values has entered a landmark-free region comprises:
computing a hash function on a selected portion of the sequence of data values,
comparing the computed hash function to a value known to represent a landmark-free data chunk, and
determining that the processing has entered into a landmark-free region if the computed hash function matches the value known to represent the landmark-free data chunk.

15. The data processing apparatus according to claim 8, wherein the first standard-data chunking technique identifies landmarks in the sequence of data values, and produces plural data chunks from the sequence of data values using the identified landmarks as boundaries of the plural data chunks.

16. The data processing apparatus of claim 15, wherein the logic is executable to use the first standard-data chunking technique in a region of the sequence that includes landmarks.

17. A data processing apparatus comprising:
a computer; and
a logic executable in the computer to:
form data chunks from a sequence of data values including:
determining whether processing of the sequence of data values has entered a landmark-free region,
in response to the logic determining that the processing has entered a landmark-free region, produce a data chunk using a specialized landmark chunking technique that is specialized for landmark-free regions, and in response to the logic determining that the processing has not entered a landmark-free region, produce a data chunk using a first standard-data landmark chunking technique, wherein the specialized landmark chunking technique:

computes fingerprint values for positions in the sequence of data values including a first fingerprint value for a first window of bytes in the sequence of data values, determines whether a second window of bytes is same as the first window of bytes, and assigns the first fingerprint value to the second window of bytes without fingerprint computation on the bytes in the second window if the second window of bytes is the same as the first window of bytes, otherwise computing a second fingerprint value for the second window of bytes.

18. An article of manufacture comprising:

a non-transitory computer-usable medium storing a computer readable program code for forming data chunks from a sequence of data values, the computer readable program code executable by a computer to cause the computer to:

determine whether processing of the sequence of data values has entered a landmark-free region, wherein the landmark-free region is devoid of any landmarks that provide boundaries of the data chunks;

produce a data chunk using a specialized landmark chunking technique that is specialized for landmark-free regions in response to determining that the processing has entered the landmark-free region; and produce a data chunk using a standard-data landmark chunking technique in response to determining that the processing of the sequence of data values has not entered a landmark-free region.

19. The article of manufacture according to claim 18, wherein the standard-data chunking technique identifies landmarks in the sequence of data values, and produces plural data chunks from the sequence of data values using the identified landmarks as boundaries of the plural data chunks.

* * * * *